US007686994B2

(12) United States Patent
Prasad et al.

(10) Patent No.: US 7,686,994 B2
(45) Date of Patent: Mar. 30, 2010

(54) METHOD OF PREPARING A CONDUCTIVE FILM

(75) Inventors: Abaneshwar Prasad, Naperville, IL (US); Ronald E. Myers, Strongsville, OH (US)

(73) Assignee: Cabot Microelectronics Corporation, Aurora, IL (US)

( * ) Notice: Subject to any disclaimer, the term of this patent is extended or adjusted under 35 U.S.C. 154(b) by 1317 days.

(21) Appl. No.: 11/070,695

(22) Filed: Mar. 2, 2005

(65) Prior Publication Data

US 2006/0199002 A1 Sep. 7, 2006

(51) Int. Cl.
*B28B 3/00* (2006.01)
*B29C 43/02* (2006.01)

(52) U.S. Cl. ........................ 264/101; 264/104; 264/105; 264/319

(58) Field of Classification Search ................. 264/104, 264/105, 101, 319, 330, 331.12–331.22
See application file for complete search history.

(56) References Cited

U.S. PATENT DOCUMENTS

| | | | | |
|---|---|---|---|---|
| 4,124,747 | A * | 11/1978 | Murer et al. | 429/210 |
| 4,158,031 | A | 6/1979 | Reuter et al. | |
| 4,333,565 | A | 6/1982 | Woods | |
| 4,333,966 | A * | 6/1982 | Deffeyes et al. | 427/98.4 |
| 4,446,185 | A | 5/1984 | Waragai et al. | |
| 4,454,248 | A | 6/1984 | Pollock et al. | |
| 4,505,973 | A | 3/1985 | Neet et al. | |
| 4,559,112 | A | 12/1985 | Tamamura et al. | |
| 4,621,106 | A | 11/1986 | Fracalossi et al. | |
| 4,629,585 | A | 12/1986 | McCracken et al. | |
| 4,719,039 | A | 1/1988 | Leonardi | |
| 4,800,126 | A | 1/1989 | Leonardi | |
| 4,839,114 | A * | 6/1989 | Delphin et al. | 264/40.4 |
| 4,976,890 | A | 12/1990 | Felter et al. | |
| 5,286,762 | A | 2/1994 | Funaki et al. | |
| 5,292,792 | A * | 3/1994 | Carew | 524/550 |
| 5,373,031 | A | 12/1994 | Funaki et al. | |
| 5,578,901 | A | 11/1996 | Blanchet-Fincher et al. | |
| 5,733,480 | A * | 3/1998 | Lee et al. | 252/511 |
| 5,795,500 | A | 8/1998 | Law et al. | |

(Continued)

FOREIGN PATENT DOCUMENTS

EP 0 338 131 B1 10/1989

(Continued)

OTHER PUBLICATIONS

Wilke G, Derwent abstract of WO 0127211, published Apr. 2001.*

(Continued)

*Primary Examiner*—Joseph S Del Sole
*Assistant Examiner*—Ryan Ochylski
(74) *Attorney, Agent, or Firm*—Thomas E. Omholt; Francis J. Koszyk; Steven D. Weseman

(57) ABSTRACT

The invention provides a method for producing a conductive film that generates an electric current via field emission of electrons, which method comprises incorporating an electrically conductive material into a thermoplastic polymer. The invention also provides a conductive film and a method for generating an electric current via field emission of electrons.

16 Claims, 3 Drawing Sheets

U.S. PATENT DOCUMENTS

| | | | | |
|---|---|---|---|---|
| 5,844,036 | A | 12/1998 | Hughes | |
| 5,883,176 | A | 3/1999 | Gerroir et al. | |
| 5,958,302 | A | 9/1999 | Cunningham et al. | |
| 5,968,674 | A | 10/1999 | Hsieh et al. | |
| 6,097,138 | A * | 8/2000 | Nakamoto | 313/309 |
| 6,149,848 | A * | 11/2000 | Makise et al. | 264/105 |
| 6,194,317 | B1 | 2/2001 | Kaisaki et al. | |
| 6,250,984 | B1 | 6/2001 | Jin et al. | |
| 6,280,799 | B1 | 8/2001 | Okabe et al. | |
| 6,299,812 | B1 * | 10/2001 | Newman et al. | 264/176.1 |
| 6,322,860 | B1 | 11/2001 | Stein et al. | |
| 6,380,294 | B1 | 4/2002 | Babinec et al. | |
| 6,436,221 | B1 | 8/2002 | Chang et al. | |
| 6,440,331 | B1 | 8/2002 | Carano et al. | |
| 6,448,709 | B1 | 9/2002 | Chuang et al. | |
| 6,451,433 | B1 | 9/2002 | Oka et al. | |
| 6,534,911 | B1 | 3/2003 | Ando | |
| 6,558,577 | B1 * | 5/2003 | Niihara et al. | 252/511 |
| 6,569,937 | B2 | 5/2003 | Foulger et al. | |
| 6,576,692 | B1 | 6/2003 | Ohtsuka et al. | |
| 6,617,773 | B1 | 9/2003 | Yamamoto et al. | |
| 6,620,640 | B2 | 9/2003 | Gilton | |
| 6,629,833 | B1 | 10/2003 | Ohya et al. | |
| 6,630,772 | B1 * | 10/2003 | Bower et al. | 313/311 |
| 6,680,016 | B2 * | 1/2004 | Wang et al. | 264/105 |
| 6,707,236 | B2 | 3/2004 | Pelrine et al. | |
| 6,774,177 | B1 * | 8/2004 | Wilke | 524/591 |
| 2002/0039675 | A1 * | 4/2002 | Braun et al. | 429/34 |
| 2003/0122111 | A1 * | 7/2003 | Glatkowski | 252/500 |
| 2003/0132393 | A1 | 7/2003 | Dimitrijevic et al. | |
| 2003/0194959 | A1 | 10/2003 | Grumbine et al. | |
| 2004/0025732 | A1 * | 2/2004 | Tuck et al. | 101/483 |
| 2004/0070326 | A1 | 4/2004 | Mao et al. | |
| 2004/0094750 | A1 * | 5/2004 | Widagdo et al. | 252/500 |
| 2007/0020450 | A1 * | 1/2007 | Kitamura et al. | 428/332 |

FOREIGN PATENT DOCUMENTS

| | | |
|---|---|---|
| EP | 0 843 902 B1 | 5/1998 |

OTHER PUBLICATIONS

Busta et al., *Journal of Vacuum Science & Technology B*, 21(1), 344-349 (2003).

Busta et al., *Applied Physics Letters*, 83(9), 1779-1781 (2003).

Busta et al., *Journal of Vacuum Science & Technology B*, 22(3), 1261-1265 (2004).

McGrath et al., *Proceedings of the Sixth Japan-U.S. Conference on Composite Materials*, 213-221 (1992).

*Vacuum Microelectronics*, (Zhu, Wei, ed.), 289-347 (John Wiley & Sons, Inc., New York, NY, 2001).

* cited by examiner

METHOD OF PREPARING A CONDUCTIVE FILM

FIELD OF THE INVENTION

This invention pertains to a conductive film that generates an electric current via field emission of electrons and methods for producing the same.

BACKGROUND OF THE INVENTION

There is great interest in field emission electron sources, often referred to as field emission materials or field emitters, for use in a variety of electronic applications, such as in flat panel display monitors, television displays, vacuum electronic devices, emission gate applications, klystrons, vacuum microelectronics applications, and the like.

The field of vacuum microelectronics began with the development of a flat display using microscopic molybdenum cones singly or in arrays (so-called Spindt emitters). Further work led to investigations using arrays consisting of silicon microtips, wherein silicon is oxidized followed by patterning of the oxide and selective etching to form silicon tips, which can act as cold cathodes for a field emission display. Development of new materials for cold cathodes has led to cathode arrays constructed from silicon, gallium arsenide, molybdenum, nickel, platinum, iridium, diamond, and conducting carbides.

Generally, the phenomenon of field emission refers to emission of electrons from a conductive material under the influence of an applied electric field. When a conductive material, as a cathode, is placed proximately to an anode under a high vacuum, and an electric potential is applied across the gap, the resulting flow of electrons from cathode to anode via field emission completes an electric circuit and results in the generation of an electric current.

Typically, field emission devices are comprised of arrays of sharp pointed tips from which electrons are emitted. For example, U.S. Pat. No. 6,620,640 describes a process comprising patterning and doping of a silicon substrate. The doped silicon substrate is then anodized. Where the silicon substrate is doped, spires of porous silicon are formed. These sharp spires or asperities are useful as emitter tips.

An impediment to development of such devices lies in the manufacturing difficulties that are necessary to overcome in order to fabricate the arrays of tips. Efforts to overcome the difficulties posed by such technology has led to the discovery that materials such as diamond-like films or small conductive particles, particularly carbon nanotubes, either arranged in arrays or distributed in a matrix, can be field emitters. U.S. Pat. No. 6,250,984 describes a process for fabricating carbon nanotube field emitter structures. The carbon nanotubes are mixed with metal particles and consolidated into a compact, and the compact is then sectioned to expose a substantial number of nanotube ends. A layer of the metal is selectively etched from the sectioned surface, exposing nanotubes protruding from the surface. The resulting structure purportedly provides a device having improved field emission properties.

Despite the advances that have been made in exploitation of field emitting properties of particulate materials, several technological hurdles remains before such field emitters can be utilized in practical devices. Typically, field emitters comprising carbon nanotubes are fabricated microdevices consisting of aligned preformed carbon nanotubes retained in a support, or consisting of carbon nanotubes grown into a preformed support. There remains a need for field emitting materials that are simply prepared, do not require complex support elements and methods of fabrication, and are stable under typical operating conditions.

The invention provides such a field emitting material and methods for its production and use. These and other advantages of the invention, as well as additional inventive features, will be apparent from the description of the invention provided herein.

BRIEF SUMMARY OF THE INVENTION

The invention provides a method for producing a conductive film that generates an electric current via field emission of electrons. In a first embodiment, the method comprises (i) providing a thermoplastic polymer having a flow temperature of about 100° C. or higher, (ii) mixing an electrically conductive material with the thermoplastic polymer to provide a thermoplastic polymer comprising an electrically conductive material, and (iii) forming the thermoplastic polymer comprising an electrically conductive material into a conductive film by applying a pressure to the thermoplastic polymer at or above the flow temperature of the thermoplastic polymer.

In a second embodiment, the method comprises (i) providing a thermoplastic polymer having a flow temperature of about 100° C. or higher, (ii) forming the thermoplastic polymer into a film by applying a pressure to the thermoplastic polymer at or above the flow temperature of the thermoplastic polymer, (iii) applying an electrically conductive material to a surface of the film, and (iv) incorporating the electrically conductive material into the film by heating the film at or above the flow temperature of the film.

In a third embodiment, the method comprises (i) providing a thermoplastic polymer comprising pores and having a flow temperature of about 100° C. or higher, (ii) subjecting the thermoplastic polymer to a vacuum while contacting at least one surface of the thermoplastic polymer with a medium comprising (a) a liquid having a vapor pressure and (b) an electrically conductive material, such that at least some of the medium is introduced into the thermoplastic polymer, (iii) removing the liquid having a vapor pressure from the thermoplastic polymer, such that the electrically conductive material remains in the thermoplastic polymer, and (iv) forming the thermoplastic polymer into a conductive film by applying a pressure to the thermoplastic polymer at or above the flow temperature of the thermoplastic polymer.

The invention also provides a method for the generation of an electric current via the field emission of electrons comprising providing an assembly comprising the conductive film of the invention and an electrode with a distance therebetween, wherein the assembly is maintained at a pressure of about $7\times10^{-6}$ kPa or less in an enclosure for the assembly, and applying a sufficient voltage differential between the conductive film and the electrode to induce a flow of current between the conductive film and the electrode.

The invention further provides a conductive film that generates an electric current via field emission of electrons, which film comprises a non-crosslinked thermoplastic polymer having a flow temperature of about 100° C. or higher and an electrically conductive material, wherein the electrically conductive material is dispersed within the thermoplastic polymer.

DETAILED DESCRIPTION OF THE INVENTION

Figure 1:
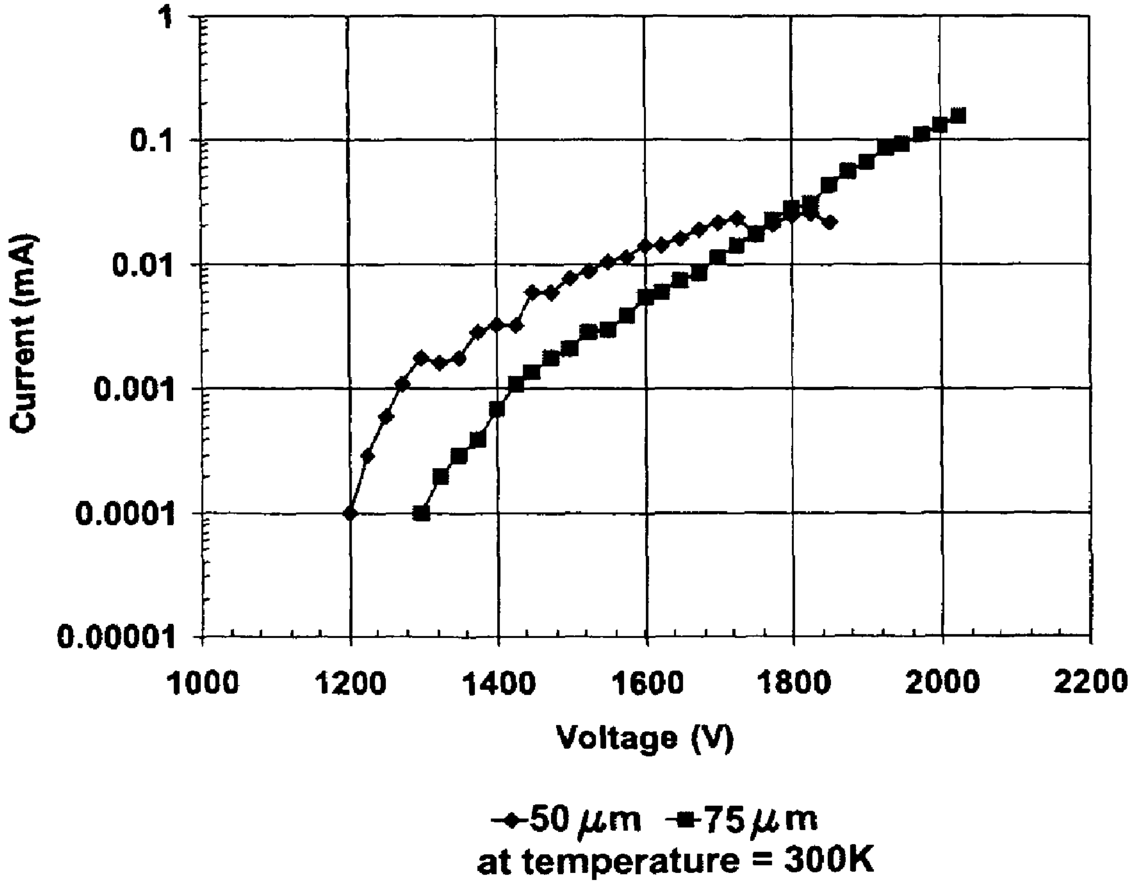
FIG. 1 is a graph of emission current versus voltage for a conductive film of the invention at extraction electrode gaps of 50 μm and 75 μm and at a temperature of 300 K.

The invention is directed to a method for producing a conductive film that generates an electric current via field emission of electrons. The method comprises providing a thermoplastic polymer having a flow temperature of about 100° C. or higher, combining an electrically conductive material with the thermoplastic polymer to provide a thermoplastic polymer comprising an electrically conductive material, and forming the thermoplastic polymer into a conductive film (before or after combining the electrically conductive material with the thermoplastic polymer) by applying a pressure to the thermoplastic polymer at or above the flow temperature of the thermoplastic polymer.

A thermoplastic polymer useful in the invention can be any suitable thermoplastic polymer. The thermoplastic polymer desirably is substantially non-crosslinked. A polymer may exhibit either or both a Tg (the glass transition temperature) and a Tm (the melt temperature of a crystal). If a polymer is semi-crystalline, it has both a Tm and a Tg, where Tm is greater than Tg. The flow temperature for a polymer is above the Tg and/or the Tm of the polymer. If a polymer is amorphous and has no crystallinity, it has only a Tg. Tg's can be determined by measuring the mechanical properties, thermal properties, electric properties, rheological properties, etc. as a function of temperature. The melt temperature (Tm) is also called the flow temperature for amorphous polymers and the crystalline melting point for crystalline polymers. At the melt temperature (usually a temperature range) solid elements of the polymers are in equilibrium with the molten state, and thus the polymer mass behaves as a viscous liquid.

Generally, the thermoplastic polymer will be selected to have a flow temperature that is above the maximum operating temperature that the conductive film will be subjected to while in use. The thermoplastic polymer can be amorphous, semi-crystalline, or crystalline. The flow temperature of the thermoplastic polymer is about 100° C. or higher (e.g., about 150° C. or higher, or 200° C. or higher, or even about 250° C. or higher).

The thermoplastic polymer is stable at an elevated temperature for an extended period of time. Stability of the polymer in the context of the invention refers to the integrity of the polymer molecules over time to degradative processes such as oxidation and cleavage to smaller molecular weight fragments. The thermoplastic polymer also is preferably non-degassing under high vacuum. Non-degassing refers to a characteristic of the polymer wherein the polymer does not release volatile materials under conditions of high vacuum and/or heat. At elevated temperatures, if a polymer exhibits thermal instability, the polymer can undergo thermolytic cleavage of polymer chains to liberate lower molecular weight fragments. The lower molecular weight fragments can have a sufficient vapor pressure to become volatilized under conditions of high vacuum and elevated temperature. Furthermore, some thermoplastic polymers may entrain lower molecular weight molecules (e.g., monomers and small molecular weight oligomers) within the polymeric matrix during the process of polymerization. Thermoplastic polymers can also contain other impurities introduced via impure monomers, solvents, reagents, chain initiators, and other components of the polymerization reaction mixture. At elevated temperatures and reduced pressure, the monomers, small oligomers, and other impurities can be released in the gaseous state from the polymeric matrix.

The thermoplastic polymer preferably is selected from the group consisting of polyarylene ethers, polyetheretherketone, polyetherketoneketone, polyetherimide, cyclized polyimides, fluorinated polyimides, polybenzimidazole, polybenzoxazole, polyolefins, polycarbonates, polyimides, polyesters, cyclic polyolefins, and elastomers. More preferably, the thermoplastic polymer is a polyetheretherketone or a polyolefin.

Suitable electrically conductive materials can be any material capable of conducting electrical current. Examples of electrically conductive materials useful in the context of the invention include but are not limited to electrically conductive materials comprising, consisting essentially of, or consisting of carbon and/or metal(s).

Electrically conductive materials comprising carbon include all types of conductive carbon blacks, many of which are known in the art. There are a wide variety of carbon blacks, all of which have some degree of electrical conductivity, produced industrially and otherwise, using a variety of techniques. Preferably, carbon blacks useful in the invention are purified so as to be substantially free of volatile impurities. However, even crude forms of carbon black, such as are emitted from the exhaust of diesel engines, are suitable electrically conductive materials in the context of the invention.

Electrically conductive materials suitable for use in the context of the invention include carbon fibers. Preferred carbon fibers include carbon nanofibers. Generally, carbon nanofibers are produced by vapor phase pyrolysis of suitable hydrocarbon feedstocks over catalysts that include, for example, nickel metal and nickel compounds. Carbon nanofibers are closely related to carbon nanotubes. Carbon nanotubes typically consist of a sheet or sheets of graphene that are rolled about a central axis, or whose walls have no defects such that as a result the carbon nanotubes can be considered to be single crystals, whereas carbon nanofibers do not possess such features. Carbon nanofibers can be produced in varying lengths and diameters depending on the conditions used for preparation.

Carbon nanofibers useful in the invention can have any suitable aspect ratio but typically will have an aspect ratio of about 25 or more (e.g., about 25 to about 250, or about 50 to about 150). The aspect ratio refers to the ratio of length to the diameter of the nanofibers. Typically, carbon nanofibers useful in the invention have a length of about 0.5 μm or more (e.g., about 1 μm or more, or about 2 μm or more). Preferably, the carbon nanofibers have a length of about 20 μm or less (e.g., about 10 μm or less, or about 5 μm or less). More preferably, the carbon nanofibers will have a length of about 1 to about 5 μm. Carbon nanofibers useful in the invention typically have a diameter of about 50 nm or more (e.g., about 75 nm or more, or about 100 nm or more). Preferably, the carbon nanofibers have a diameter of about 200 nm or less (e.g., about 175 nm or less, or about 150 nm or less).

Suitable electrically conductive materials include carbon nanotubes. Carbon nanotubes are fullerene-related structures consisting of graphene structures closed at either end with pentagonal ring-containing caps and typically consist of a sheet or sheets of graphene rolled about a central axis. Carbon nanotubes are prepared by the laser vaporization of carbon in a furnace at high temperatures and occur as single wall carbon nanotubes and as multiple wall carbon nanotubes. Both single wall and multiple wall carbon nanotubes are useful electrically conductive materials in the context of the invention. The formation of carbon nanotubes can be controlled to produce carbon nanotubes of various lengths and diameters.

Carbon nanotubes useful in the invention can have any suitable aspect ratio but typically will have an aspect ratio (as defined herein) of about 25 or more (e.g., about 25 to about 250, or about 50 to about 150). Typically, carbon nanotubes useful in the invention have a length of about 0.5 μm or more (e.g., about 1 μm or more, or about 2 μm or more). Preferably, the carbon nanotubes have a length of about 20 μm or less (e.g., about 10 μm or less, or about 5 μm or less). Most preferably, the carbon nanotubes will have a length of about 1 to about 5 μm. Carbon nanotubes useful in the invention typically have a diameter of about 50 nm or more (e.g., about 75 nm or more, or about 100 nm or more). Preferably, the carbon nanotubes have a diameter of about 200 nm or less (e.g., about 175 nm or less, or about 150 nm or less).

Electrically conductive materials comprising a metal include all types of conductive metals, many of which are known in the art. Such electronically conductive materials comprising metal(s) typically will be in the form of particles comprising the metal(s). Suitable metals include but are not limited to copper, silver, gold, platinum, iridium, palladium, nickel, zinc, lead, zirconium, and tin. The metal particles can be in the form of powders, fibers, or flakes. The metal can be in the form of colloidal particles or particle dispersions, such as are disclosed in U.S. Pat. No. 6,451,433 and references disclosed therein. The metal particles can be coated with inorganic or organic materials to enhance the dispersion, conductivity, and mechanical properties of the film.

When the conductive film comprises an electrically conductive material having a low aspect ratio (e.g., carbon blacks or metals), the particles of the electrically conductive material can be characterized by an average particle size. In this case, the particles of electrically conductive material can have any suitable average particle size. Typically, the particles of electrically conductive material will have an average particle size of about 1 μm or less (e.g., about 0.8 μm or less, or about 0.6 μm or less, or even about 0.4 μm or less). Preferably, the particles of electrically conductive material will have an average particle size of about 10 nm or more (e.g., about 25 nm or more, or about 50 nm or more). As used herein, the term "average particle size" refers to the average size on a number basis. For the purposes of the invention, average particle size is defined as that average particle size which is obtained by an appropriate measurement for the particular particle shape in question. The particles of electrically conductive material can have any suitable shape including spheres, rectangular solids, cubes, flakes, acicular shapes, and mixtures thereof. Typically the particle size is the diameter of the smallest sphere that encompasses the particle of interest.

Any suitable amount of electrically conductive material can be used in preparing the conductive film of the invention. Typically, the conductive film comprises about 0.1 wt. % or more (e.g., about 0.5 wt. % or more, or about 1 wt. % or about 2 wt. % or more, or even about 5 wt. % or more) of the electrically conductive material, based on the total weight of the components of the conductive film. Typically, the conductive film comprises about 40 wt. % or less (e.g., about 35 wt. % or less, or about 30 wt. % or less, or even about 25 wt. % or less) of the electrically conductive material, based on the total weight of the components of the conductive film. More preferably, the conductive film comprises about 2 wt. % to about 20 wt. % of electrically conductive material.

The conductive film can further comprise particles of a dielectric material. The presence of particles of a dielectric material in the conductive film is believed to provide a plurality of triple junctions, wherein conductor (e.g., the electrically conductive material), insulator (e.g., the dielectric material), and vacuum meet. Preferred emission can take place at such a triple junction due to the abrupt change in the built-in potential across the triple junction.

The dielectric material can be any suitable dielectric material. Examples of suitable dielectric materials include but are not limited to ceramics, mica, glass, and various metal oxides. Preferably, the dielectric material is a metal oxide, and more preferably, the dielectric material comprises, consists essentially of, or consists of silica.

If a dielectric material is desired, the amount of dielectric material can be any suitable amount. Typically, the conductive film comprises about 0.1 wt. % or more (e.g., about 0.5 wt. % or more, or about 1 wt. % or about 2 wt. % or more, or even about 5 wt. % or more) of dielectric material, based on the total weight of the components of the conductive film. Preferably, the conductive film comprises about 20 wt. % or less (e.g., about 15 wt. % or less, or about 10 wt. % or less, or even about 5 wt. % or less) of dielectric material, based on the total weight of the components of the conductive film. The average particle size of the dielectric material can be any suitable particle size, but typically the average particle size is about 20 nm to about 200 nm (e.g., about 40 nm to about 150 nm), with the particle size typically equal to the diameter of the smallest sphere that encompasses the particle.

Three embodiments of the inventive method for producing a conductive film that generates an electric current via field emission of electrons are further described below.

In the first embodiment, the method for producing a conductive film that generates an electric current via field emission of electrons comprises (i) providing a thermoplastic polymer having a flow temperature of about 100° C. or higher, (ii) mixing an electrically conductive material with the thermoplastic polymer to provide a thermoplastic polymer comprising an electrically conductive material, and (iii) forming the thermoplastic polymer comprising an electrically conductive material into a conductive film by applying a pressure to the thermoplastic polymer at or above the flow temperature of the thermoplastic polymer. The components of the conductive film, which comprise the thermoplastic polymer, electrically conductive material, and optional dielectric material can be combined in any suitable manner.

For example, a thermoplastic polymer having a flow temperature can be mixed by a conventional mixer, wherein the mixer is heated at or above the flow temperature of the thermoplastic polymer. An electrically conductive material then is added to the thermoplastic polymer in a suitable amount as described herein and mixed for a time and at a sufficient speed to insure uniform distribution of the electrically conductive material in the thermoplastic polymer. A suitable dielectric material can be added to the thermoplastic polymer at any time during the mixing process, either before, after, or simultaneously with the electrically conductive material.

Alternatively, the thermoplastic polymer, electrically conductive material, and optionally a dielectric material can be combined in the solid state to provide a mixture. The mixture comprising the thermoplastic polymer, electrically conductive material, and optional dielectric material then can be mixed by, for example, a conventional mixer, wherein the mixer is heated at or above the flow temperature of the thermoplastic polymer, and mixed for a time and at a sufficient speed to insure distribution of the electrically conductive material in the thermoplastic polymer. The thermoplastic polymer typically will be supplied commercially as pellets. The pellets of thermoplastic polymer can be ground into smaller particles before mixing with the electrically conductive material and optional dielectric material, or the pellets can be used as supplied. A combination of thermoplastic polymer, electrically conductive material, and optional dielectric material can be ground, sintered, fused, necked, or extruded to provide a mixture.

In addition, the mixture of the thermoplastic polymer, electrically conductive material, and optional dielectric material can be mixed under conditions such that the thermoplastic polymer undergoes a phase transition resulting from frictional heating to a temperature above the flow temperature of the thermoplastic polymer caused by passage through a mixing apparatus (e.g., a single screw extruder), optionally with the application of external heat, such that the electrically conductive material and optional dielectric material is mixed with the thermoplastic polymer. An example of a suitable apparatus for use in mixing the components of the conductive film in such a manner is an injection molding device.

The thermoplastic polymer typically is a pre-formed polymer; however, the thermoplastic polymer can be formed in situ according to any suitable method, many of which are known in the art. A mixture of monomers can be combined with an electrically conductive material, optional dielectric material, and a polymerization initiator, and the monomers subsequently are polymerized to provide a thermoplastic polymer comprising electrically conductive material dispersed within.

The mixture of thermoplastic polymer, electrically conductive material, and optional dielectric material is then formed into a conductive film. A film in the context of the invention is typically a continuous sheet with a thickness of about 0.01 mm to about 20 mm. The mixture of thermoplastic polymer, electrically conductive material, and optional dielectric material can be formed into a film by a process of hot pressing. In a process of hot pressing, a predetermined amount of the polymer mixture can be compressed between two planar surfaces of a pressing apparatus while heating the polymer mixture at or above the flow temperature of the thermoplastic polymer. A continuous film-forming process can also be used to produce the conductive film of the invention, for example by passing the polymer mixture between heated rollers either as a solid or as a melt to produce the conductive film. Other suitable processes for film forming can employed such as calendaring, thermoforming, heat setting, melt roll coating, and the like.

In the second embodiment, the method for producing a conductive film that generates an electric current via field emission of electrons comprises (i) providing a thermoplastic polymer having a flow temperature of about 100° C. or higher, (ii) forming the thermoplastic polymer into a film by applying a pressure to the thermoplastic polymer at or above the flow temperature of the thermoplastic polymer, (iii) applying an electrically conductive material to a surface of the film, and (iv) incorporating the electrically conductive material into the film by heating the film at or above the flow temperature of the thermoplastic polymer.

When the thermoplastic polymer having electrically conductive material disposed on a surface is heated at or above the flow temperature of the polymer, the chains of the thermoplastic polymer become able to flow, e.g., to deform like a liquid, and the viscosity of the thermoplastic polymer decreases. Thus, the electronically conductive material on the surface of the film of the thermoplastic polymer can settle into the surface of the thermoplastic polymer and become incorporated in the thermoplastic polymer by the action of gravity. The longer the amount of time that the thermoplastic polymer is maintained at or above the flow temperature of the thermoplastic polymer, the deeper the particles can settle into the thermoplastic polymer. The settling properties of the particles of electrically conductive material can be affected by the particle size and type of electrically conductive material, and thus choice of particle size and type of the electrically conductive material can be used to affect the distribution of particles of electrically conductive material into the thermoplastic polymer. When the thermoplastic polymer is then cooled to below its flow temperature, the thermoplastic polymer again becomes rigid, or glassy, and retains the particles of the electronically conductive material in a relatively fixed structure.

A dielectric material optionally can be incorporated into the thermoplastic polymer at any suitable time. Thus, the dielectric material and an electrically conductive material can be applied simultaneously to a surface of the thermoplastic polymer, or the dielectric material can be applied in a first step, after which the thermoplastic polymer may be heated at or above the flow temperature of the thermoplastic polymer, followed by application of an electrically conductive material. The order may be reversed, wherein the electrically conductive material is added to the surface of the thermoplastic polymer prior to the addition of the dielectric material.

The electrically conductive material and/or optional dielectric material can be distributed on a surface of the thermoplastic polymeric film evenly to provide a uniform distribution of electrically conductive material and/or optional dielectric material, or the electrically conductive material and/or optional dielectric material can be distributed in a non-uniform manner. For example, the electrically conductive material and/or optional dielectric material can be concentrated in a particular thickness of the thermoplastic polymeric film, such as at or near one or both surfaces of the thermoplastic polymeric film. Alternatively, electrically conductive material and optional dielectric material can be dispersed on a first surface of a first thermoplastic polymeric film, and then a second thermoplastic polymeric film can be brought into contact with the first surface of the first thermoplastic polymeric film. Heating of the resulting assembly of the first and second thermoplastic polymeric films at or above the flow temperature of the thermoplastic polymer will result in a fusing of the two separate films into a single film comprising electrically conductive material and optional dielectric material disposed within the interior of the resulting unitary thermoplastic polymeric film. The electrically conductive material can also be concentrated into areas defining a pattern.

In the third embodiment, the method for producing a conductive film that generates an electric current via field emission of electrons comprises (i) providing a thermoplastic polymer comprising pores and having a flow temperature of about 100° C. or higher, (ii) subjecting the thermoplastic polymer to a vacuum while contacting at least one surface of the thermoplastic polymer with a medium comprising (a) a liquid having a vapor pressure and (b) an electrically conductive material, such that at least some of the medium is introduced into the thermoplastic polymer, (iii) removing the liquid having a vapor pressure from the thermoplastic polymer, such that the electrically conductive material remains in the thermoplastic polymer, and (iv) forming the thermoplastic polymer into a conductive film by applying a pressure to the thermoplastic polymer at or above the flow temperature of the thermoplastic polymer.

The term "pore" describes void spaces within the polymeric material matrix that are at least partially bounded solely by the polymeric material. In addition, the term "pore" describes both open-celled pores and closed-celled pores. Numerous methods exist in the art for the production of thermoplastic polymers comprising pores, such as described in, for example, Polymeric Foams and Foam Technology, $2^{nd}$ ed., D. Klempner and V. Sendijarevic, eds., Hanser Gardner (2004).

The pores of the thermoplastic polymer can comprise open-celled pores, closed-celled pores, or a combination thereof. For example, the pores can comprise about 70% or more (e.g., about 80% or more, or about 90% or more) by volume open-celled pores. The pores also can comprise about 70% or more (e.g., about 80% or more, or about 90% or more) by volume closed-celled pores. The thermoplastic polymer pores can have any suitable void volume (i.e., the total volume of the pores). For example, the void volume can be about 75% or less (e.g., about 65% or less, about 55% or less, or about 45% or less).

The thermoplastic polymer comprising pores (e.g., polymeric foam) is subjected to a vacuum while contacting at least one surface of the thermoplastic polymer with a medium comprising (a) a liquid having a vapor pressure and (b) an electrically conductive material, and allowing the medium comprising the electrically conductive material to permeate at least a portion of the pores of the polymeric material. The electrically conductive material is typically dispersed in the liquid having a vapor pressure, which serves as a carrier. The process of applying a vacuum and allowing the medium to permeate the polymeric material can be repeated to achieve a desired loading of the electrically conducting material within the thermoplastic polymer.

The vacuum can be any pressure below ambient atmospheric pressure. The vacuum can be a pressure of less than about 100 kPa (e.g., about 50 kPa or less, about 10 kPa or less, or about 1 kPa or less). The medium comprising the electrically conductive material is distributed in the pores of the polymeric material by the pressure differential. The thermoplastic polymer can be heated at or near the melt or flow temperature of the thermoplastic polymer and the vacuum can be used to distribute particles on the outside of pores in the semifluid thermoplastic polymer. This would be particularly useful when the pore size is smaller than the particle size. The pores could act as nucleation sites for particle agglomeration thereby creating conductive strings surrounding the pores.

The thermoplastic polymer can be subjected to a vacuum either before contacting the thermoplastic polymer with the medium or after contacting the thermoplastic polymer with the medium. For example, the thermoplastic polymer can be placed into contact with the medium, and then a vacuum can be applied to the thermoplastic polymer while in contact with the medium. Alternatively, the thermoplastic polymer can be subjected to a vacuum within a suitable enclosure, and then the medium can be introduced into the enclosure.

At least one surface of the thermoplastic polymer is contacted with the medium comprising the electrically conductive material. The thermoplastic polymer can be subjected to a vacuum with one or more surfaces in contact with the medium. After an appropriate time, another surface or surfaces can be placed in contact with the medium. The thermoplastic polymer also can be immersed in the medium.

The liquid having a vapor pressure can be any suitable liquid that is compatible with the thermoplastic polymer and with the electrically conductive material. The liquid desirably does not dissolve, react with, or otherwise degrade the thermoplastic polymer. Additionally, the liquid having a vapor pressure will tend to allow for dispersion of the electrically conducting material without aggregation of the electrically conducting material. Examples of suitable liquids having a vapor pressure include but are not limited to lower alcohols, aliphatic hydrocarbons, and aromatic hydrocarbons. Preferably, the liquid having a vapor pressure is an aromatic hydrocarbon selected from the group consisting of benzene, toluene, xylene, cumene, cymene, and mesitylene. More preferably the liquid is mesitylene.

The medium can further comprise particles of a dielectric material. The characteristics of the dielectric material can be as described herein.

The liquid having a vapor pressure is then removed from the thermoplastic polymer by any suitable technique, such as by evaporation, or drying, leaving particles of electrically conductive material dispersed within the thermoplastic polymer. Any suitable technique for drying the thermoplastic polymer can be used, for example, by drying the thermoplastic polymer under reduced pressure with the optional application of heat. While the thermoplastic polymer desirably is substantially freed of the liquid having a vapor pressure, the presence in the thermoplastic polymer of a small amount of the liquid having a vapor pressure after the drying process typically will not be detrimental.

The thermoplastic polymer is then formed into a conductive film by the application of pressure while heating the thermoplastic polymer at or above the flow temperature of the thermoplastic polymer, as described herein. Under suitable conditions for formation of the conductive film, the pores contained within the thermoplastic polymer typically collapse so that the resulting conductive film is substantially non-porous (e.g., the conductive film has a void volume of about 10% or less, or about 5% or less, or even about 2% or less).

The method of the third embodiment is advantageously utilized to prepare conductive films comprising high-temperature polymers having high melting and flow temperatures and having high viscosity in the fluid state.

The invention also provides a method of generating an electric current via field emission of electrons using the conductive films described herein. The method comprises (i) providing an assembly comprising the electrically conductive film as described herein, with an electrode positioned such that there is a space between the electrode and the electrically conductive film, wherein the assembly is maintained at a pressure of about $7\times10^{-6}$ kPa or less, and (ii) applying a voltage differential between the electrically conductive film and the electrode to induce a flow of electrons between the electrically conductive film and the electrode. The conductive film can be prepared by any of the methods described herein.

Typically, the assembly comprises a substrate with which the conductive film is in continuous contact on at least one surface. Suitable substrates comprise an electrically conducting layer deposited over a dielectric material. The purpose of the electrically conducting layer is to provide an electrical circuit between the electrically conducting film serving as a cathode and the electrode serving as an anode, so that an electrical current can be generated. The electrically conducting layer can be continuously deposited over a dielectric material, or the electrically conducting layer can be deposited in a pattern. An example of a suitable substrate comprises a layer of a metal (e.g., copper or aluminum) deposited on a silicon substrate.

In the method of generating an electrical current, the electrode serves as an anode, while the conductive film serves as a cathode. The electrode can be a single electrode or a plurality of electrodes positioned in an array. The electrode or plurality of electrodes is positioned such that there is a gap between the electrode and the conductive film. An electric current via field emission of electrons is then generated by applying a voltage differential between the conductive film and the electrode or plurality of electrodes.

In addition, the electrically conductive film of the invention can be incorporated into a cathode of a field emission display device. On a substrate comprising a dielectric material is deposited a conductive material onto which the conductive film of the invention is placed to provide a cathode. An anode includes a substrate, for example glass, onto which is deposited a first conductive layer and then a second phosphor layer for receiving electrons emitted by the conductive film. A gap is provided between the cathode and anode in an assembly maintained at a pressure of about $7\times10^{-6}$ kPa or less. Electrons are emitted from the conductive film in response to an appropriate electric field between the cathode and the anode. Upon striking the phosphor layer, the electrons induce emission of visible light from the phosphor. The field emission display device may have independently addressable lines on both the cathode and the anode to define pixels and thus can define an image on the anode, by controlling the voltage applied across the independently addressable lines.

The electrically conductive film can be heated during the process of field emission. Although field emission can be obtained at ambient temperature, typically heating the film will result in a shift of the current/voltage curve to the "left", e.g., a given current can be achieved at a lower applied voltage. Accordingly, the assembly can be provided with means for heating the conductive film, such as an electrically resistive element incorporated into the vacuum-tight assembly, which means serves to heat the conductive film.

The invention further provides an electrically conductive film that provides an electric current via the field emission of electrons. The electrically conductive film comprises a non-crosslinked thermoplastic polymer having a flow temperature of about 100° C. or higher and an electrically conductive material, wherein the electrically conductive material is dispersed within the thermoplastic polymer. The characteristics of the components of the electrically conductive film (e.g., the thermoplastic polymer and the electrically conductive material) can be as set forth herein.

The electrically conductive film can be produced by any of the methods described herein. The choice of particular method used to prepare the conductive film can depend on, for example, the characteristics of the thermoplastic polymer and the electrically conductive material.

Advantageously, the conductive film of the invention is simply and economically prepared using readily available materials and methods. Additionally, the conductive film of the invention can be formed into any suitable shape or can be coated on any substrate to enhance conductivity, the function of the substrate, or to provide mechanical support. Suitable shapes include planar sheets, tubes, curves, cones, hemispheres, spheres, and the like. Planar sheets may be used in field emission displays devices, whereas curvilinear shapes may be used in microelectronic devices.

EXAMPLE

This example further illustrates the invention but, of course, should not be construed as in any way limiting its scope. In particular, this example illustrates an embodiment of the invention, wherein carbon nanofibers are mixed with a thermoplastic polymer and formed into a conductive film, with the resulting conductive film shown to have useful field emission properties.

A polyetheretherketone having a density of 1.3 g/mL, a melting temperature of 340° C., and a glass transition temperature of 175° C. was blended with 40 wt. % of carbon nanofibers based on the total weight of the mixture by mixing the two components at a temperature above the melt temperature of the polyetheretherketone. The resulting blend had a density of 1.43 g/mL, a melting temperature of 340-350° C., and a glass transition temperature of 180° C. The polyetheretherketone—carbon nanofiber blend was pressed into pellets using a Janus Technology screw-and-nut press, and the pellets were subjected to injection molding using a conventional injection molding apparatus to produce a square conductive film dimensioned 10.2 mm on each side and having a thickness of 3.1 mm.

The conductive film was mounted on a copper-coated silicon substrate. The conductive film-mounted substrate was then placed on a quartz disc in contact with a heater plate, and the resulting assembly was enclosed within a vacuum chamber. A tungsten probe was placed into electrical contact with a portion of the copper coating of the substrate. A second, flat polished tungsten probe having a 3 mm diameter, serving as the extraction electrode, was held in a vertically and horizontally adjustable manipulator above the surface of the conductive film. The pressure within the vacuum chamber was reduced to about $1.3\times10^{-9}$ kPa by means of a vacuum pump. The current as a function of voltage was determined at a fixed temperature by varying a voltage applied across the two probes over a range of from zero to about 2000 V, with the extraction electrode held at a distance of 50 μm or 75 μm for each experiment, the distance hereafter referred to as a "gap."

Current versus voltage measurements were made at temperatures of 300 K, 393 K, and 443 K, where the temperature refers to the approximate temperature of the conductive film and which was controlled by means of the heater plate. The results are set forth in FIG. 1 (at 300 K), FIG. 2 (at 393 K), and FIG. 3 (at 443 K) as graphs of current versus voltage.

Figure 2:
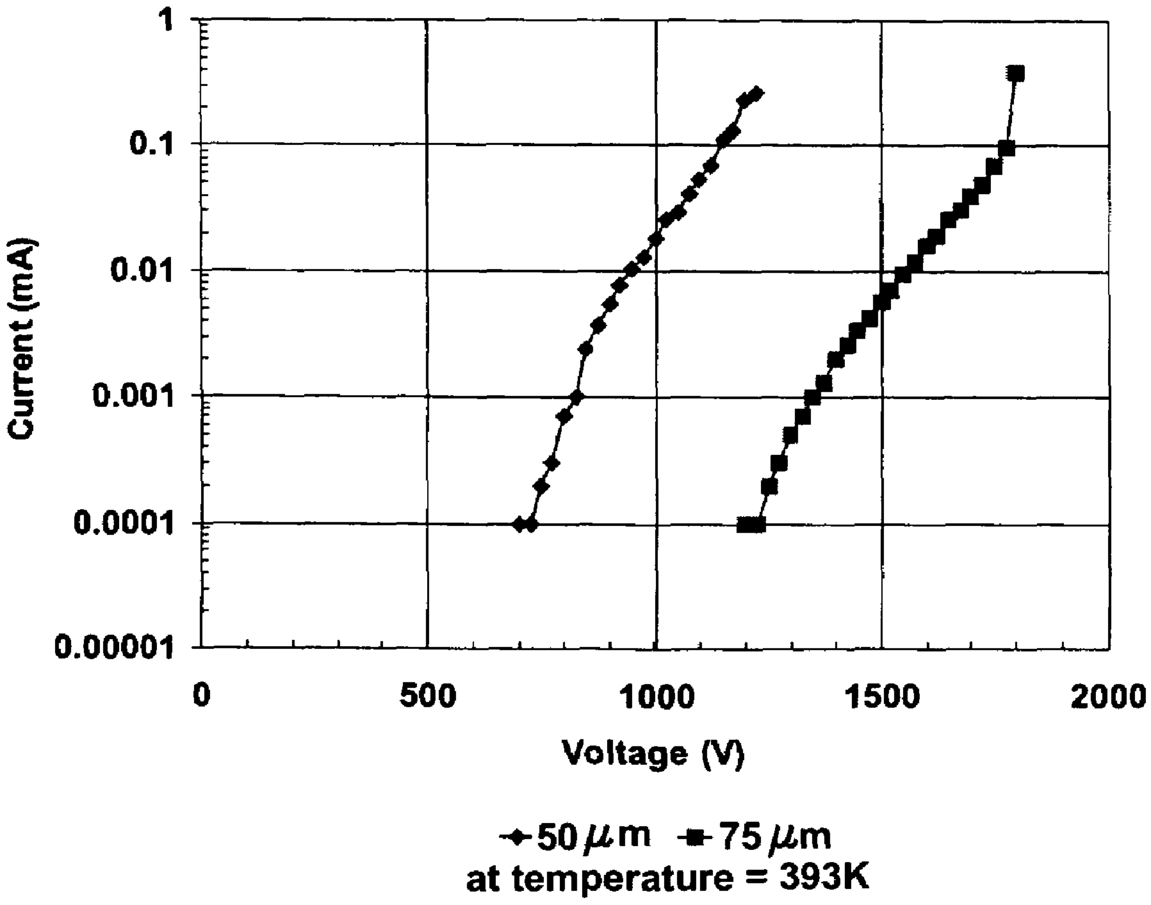
FIG. 2 is a graph of emission current versus voltage for a conductive film of the invention at extraction electrode gaps of 50 μm and 75 μm and at a temperature of 393 K.
Figure 3:
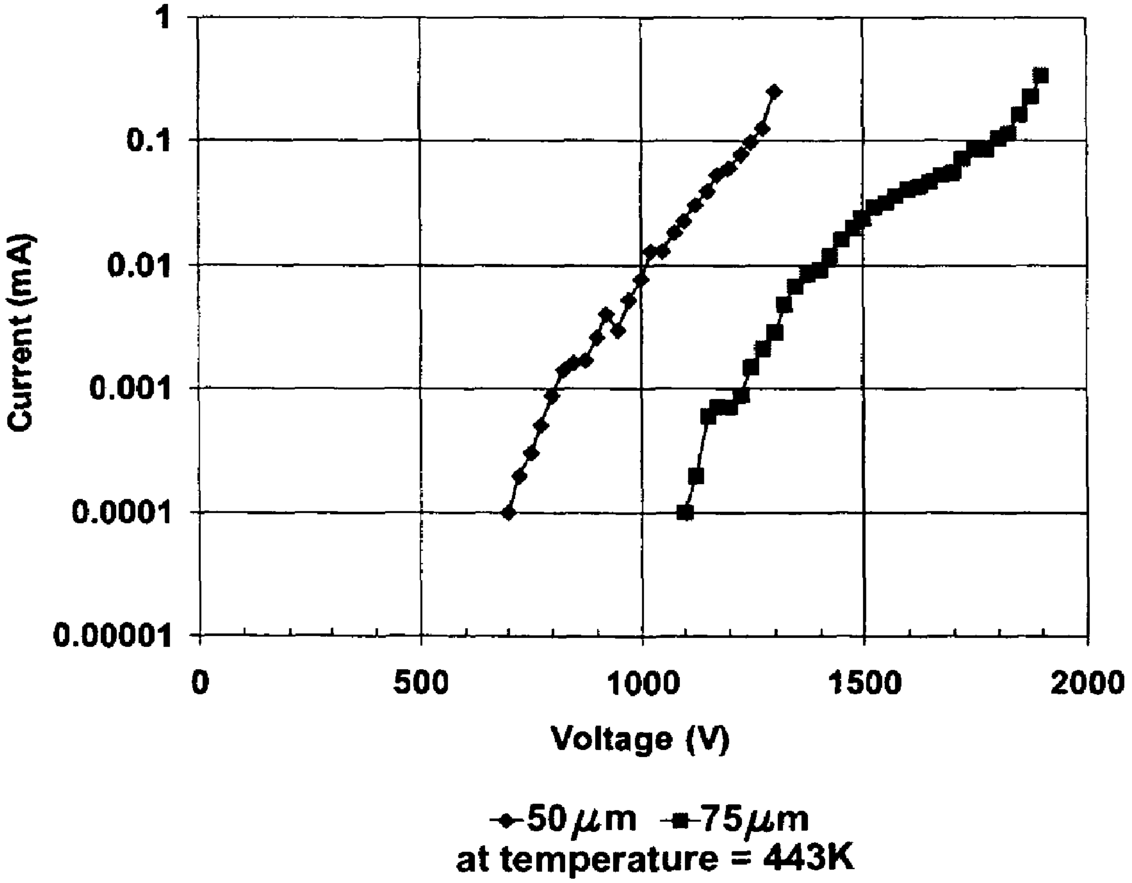
FIG. 3 is a graph of emission current versus voltage for a conductive film of the invention at extraction electrode gaps of 50 μm and 75 μm and at a temperature of 443 K.

As is apparent from the results set forth in FIGS. 1, 2, and 3, the conductive film of the invention exhibited electron emission under the influence of the applied voltage. FIG. 1 illustrates the relationship of current to voltage at a conductive film temperature of about 300 K, or approximately room temperature. The y-axis, representing current, is in a logarithmic scale, and the x-axis, representing voltage, is in a linear scale. The current-voltage curve at a gap of 50 μm is defined by diamond points, and the current-voltage curve at a gap of 75 μm is defined by square points. The turn-on voltage, defined as the voltage at which a current of approximately 10 nA is obtained, was about 1200 V at a gap of 50 μm and about 1300 V at a gap of 75 μm. Increasing the voltage resulted in a continuous increase in the current obtained, with the current at a gap of 50 μm reaching a maximum of approximately 0.03 mA at approximately 1750 V, and reaching approximately 0.11 mA at a gap of 75 μm at approximately 2100 V.

Increasing the temperature of the conductive film to 393 K, as illustrated by the current-voltage curves set forth in FIG. 2, resulted in a lowering of the turn-on voltage to approximately 700 V and 1200 V for gaps of 50 μm and 75 μm, respectively. A continuous increase in current as a function of voltage was again observed. At a temperature of 393 K, a current of approximately 0.3 mA was observed at 1200 V with a gap of 50 μm and at 1800 V with a gap of 75 μm. Referring to FIG. 3, increasing the temperature of the conductive film to 443 K resulted in little qualitative change in the current-voltage curves as compared with the observations at 393 K. Thus, the results of this example demonstrate the efficient field emission properties of the conductive films of the invention achievable at practical voltages and temperatures.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for producing a conductive film that generates an electric current via field emission of electrons comprising:

(i) providing a thermoplastic polymer comprising pores and having a flow temperature of about 100° C. or higher, (ii) subjecting the thermoplastic polymer to a vacuum while contacting at least one surface of the thermoplastic polymer with a medium comprising (a) a liquid having a vapor pressure and (b) an electrically conductive material, such that at least some of the medium is introduced into the thermoplastic polymer, (iii) removing the liquid having a vapor pressure from the thermoplastic polymer, such that the electrically conductive material remains in the thermoplastic polymer, and (iv) forming the thermoplastic polymer into a conductive film by applying a pressure to the thermoplastic polymer at or above the flow temperature of the thermoplastic polymer such that the resulting conductive film has a porosity of about 2% or less.

2. The method of claim 1, wherein the thermoplastic polymer is contacted with the medium before subjecting the thermoplastic polymer to a vacuum.

3. The method of claim 1, wherein the thermoplastic polymer is contacted with the medium after subjecting the thermoplastic polymer to a vacuum.

4. The method of claim 1, wherein the thermoplastic polymer comprises open-celled pores.

5. The method of claim 1, wherein the thermoplastic polymer comprises closed-celled pores.

6. The method of claim 1, wherein the thermoplastic polymer is selected from the group consisting of polyarylene ethers, polyetheretherketone, polyetherketoneketone, polyetherimide, cyclized polyimides, fluorinated polyimides, polybenzimidazole, polybenzoxazole, polyolefins, polycarbonares, polyimides, polyesters, cyclic polyolefins, and elastomers.

7. The method of claim 6, wherein the thermoplastic polymer is a polyetheretherketone.

8. The method of claim 6, wherein the thermoplastic polymer is a polyolefin.

9. The method of claim 1, wherein the electrically conductive material consists of carbon black.

10. The method of claim 1, wherein the electrically conductive material consists of carbon fibers.

11. The method of claim 1, wherein the electrically conductive material consists of carbon nanotubes.

12. The method of claim 1, wherein the electrically conductive material comprises particles comprising a metal.

13. The method of claim 1, wherein the thermoplastic polymer further comprises particles of a dielectric material.

14. The method of claim 13, wherein the dielectric material is silica.

15. The method of claim 1, wherein the thermoplastic polymer is immersed in the medium.

16. The method of claim 1, wherein the liquid having a vapor pressure is mesitylene.

* * * * *